(12) United States Patent
Ogoe et al.

(10) Patent No.: US 6,380,303 B1
(45) Date of Patent: *Apr. 30, 2002

(54) FLOW CARBONATE POLYMER BLENDS

(75) Inventors: Samuel A. Ogoe, Missouri City, TX (US); Michael E. Hus, Midland, MI (US); Brenda G. Johnson, Brazoria; Hoang T. Pham, Lake Jackson, both of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,567

(22) Filed: Feb. 24, 2000

(51) Int. Cl.$^7$ ................................................ C08L 69/00
(52) U.S. Cl. ...................................... 525/67; 525/92 E
(58) Field of Search ................................... 525/67, 92 E

(56) References Cited

U.S. PATENT DOCUMENTS

| | | |
|---|---|---|
| 3,028,365 A | 4/1962 | Schnell et al. |
| 3,169,121 A | 2/1965 | Goldberg |
| 3,243,481 A | 3/1966 | Ruffing et al. |
| 3,265,765 A | 8/1966 | Holden et al. |
| 3,280,084 A | 10/1966 | Zelinski et al. |
| 3,281,383 A | 10/1966 | Zelinski et al. |
| 3,660,535 A | 5/1972 | Finch et al. |
| 3,668,162 A | 6/1972 | Wilt |
| 3,668,263 A | 6/1972 | Morrison et al. |
| 3,787,510 A | 1/1974 | Farrar et al. |
| 4,156,069 A | 5/1979 | Prevorsek et al. |
| 4,182,818 A | 1/1980 | Tung et al. |
| 4,183,877 A | 1/1980 | Ibaragi et al. |
| 4,239,863 A | 12/1980 | Bredeweg |
| 4,260,731 A | 4/1981 | Mori et al. |
| 4,264,749 A | 4/1981 | Sigwalt et al. |
| 4,340,690 A | 7/1982 | Lal et al. |
| 4,340,691 A | 7/1982 | Lal et al. |
| 4,529,791 A | 7/1985 | Glass |
| 4,572,819 A | 2/1986 | Priddy et al. |
| 4,585,825 A | 4/1986 | Wesselmann |
| 4,666,987 A | 5/1987 | Burmester et al. |
| 4,677,162 A | 6/1987 | Grigo et al. |
| 4,940,752 A | * 7/1990 | Lo |
| 5,489,652 A | * 2/1996 | Ishii |
| 5,508,359 A | 4/1996 | Pham |
| 5,663,228 A | * 9/1997 | Sasak |
| 5,804,673 A | 9/1998 | Van Nuffel et al. |

FOREIGN PATENT DOCUMENTS

| | | |
|---|---|---|
| GB | 1130485 | 10/1968 |
| JP | 06-065330 | * 3/1994 |

* cited by examiner

*Primary Examiner*—David J. Buttner

(57) ABSTRACT

Disclosed is a polymer blend composition containing a branched aromatic carbonate polymer and a rubber-modified monovinylidene aromatic copolymer comprising a star-branched rubber and optionally, a linear rubber. The polymer blend compositions according to the invention have a desirable balance of processability and when molded, impact strength.

34 Claims, No Drawings

FLOW CARBONATE POLYMER BLENDS

FIELD OF THE INVENTION

This invention relates to compositions containing a branched carbonate polymer and a rubber-modified monovinylidene aromatic copolymer. This invention relates particularly to a blend composition having improved processability and when molded, having improved impact strength.

BACKGROUND OF THE INVENTION

Carbonate polymers derived from reactions of dihydroxyorganic compounds, particularly the dihydric phenols, and carbonic acid derivatives such as phosgene have found extensive commercial application because of their excellent physical properties. These thermoplastic polymers appear suitable for the manufacture of molded parts wherein impact strength, rigidity, toughness, heat resistance, excellent electrical properties, glass-like transparency and good clarity are required.

Unfortunately, however, these polymers are expensive in price and require a high amount of energy expenditure in extrusion and molding processes. In order to reduce the cost of processing carbonate polymers, said polymers may contain additives that reduce costs and lower the temperatures required for molding processes. The blends resulting from the processing of carbonate polymer and additive generally exhibit improved melt flow properties at the sacrifice of other desirable features such as heat resistance, impact strength and the like. In addition, blends of carbonate polymer and additive often do not exhibit a desirable glossy finish.

In view of the deficiencies of the conventional carbonate polymers and blends thereof, it would be highly desirable to provide an economical carbonate polymer composition which exhibits improved processability while retaining, to some degree, the desirable properties characteristic of carbonate polymers such as impact strength and heat resistance, and exhibiting a glossy finish.

SUMMARY OF THE INVENTION

The present invention is such a desirable polymer blend composition. The composition possesses a desirable balance of good processability, improved gloss, good thermal and physical properties, and especially, improved impact resistance. The composition is a heterogeneous blend comprising a branched aromatic carbonate polymer blended with an effective amount of a rubber-modified copolymer comprising a monovinylidene aromatic monomer, an ethylenically unsaturated nitrile monomer, and a rubber component comprising a star-branched rubber having three or more arms and optionally, a linear rubber. Preferably the branched aromatic carbonate polymer comprises a branched aromatic carbonate polymer component and a linear aromatic carbonate polymer component. Preferably, the rubber-modified copolymer is a composition prepared using bulk, mass-solution or mass-suspension polymerization techniques. Optionally, the polymer blend composition further comprises an impact modifier such as methylmethacrylate, butadiene and styrene-type core/shell grafted copolymer.

In another aspect, the present invention is a process for preparing a polymer blend composition which exhibits a desirable balance of good processability, improved gloss, good thermal and physical properties, and especially, improved impact resistance wherein a branched aromatic carbonate polymer is blended with an effective amount of a rubber-modified copolymer comprising a monovinylidene aromatic monomer, an ethylenically unsaturated nitrile monomer, and a rubber component comprising a star-branched rubber having three or more arms and optionally, a linear rubber.

In a further aspect, the present invention involves a method of molding or extruding a polymer blend composition whereby a branched aromatic carbonate polymer is blended with an effective amount of a rubber-modified copolymer comprising a monovinylidene aromatic monomer, an ethylenically unsaturated nitrile monomer, and a rubber component comprising a star-branched rubber having three or more arms and optionally, a linear rubber.

In yet a further aspect, the invention involves molded or extruded articles of a polymer blend composition comprising a branched aromatic carbonate polymer blended with an effective amount of a rubber-modified copolymer comprising a monovinylidene aromatic monomer, an ethylenically unsaturated nitrile monomer, and a rubber component comprising a star-branched rubber having three or more arms and optionally, a linear rubber.

The polymer blend compositions of the present invention are especially useful in the preparation of molded objects notably parts having large surfaces prepared by injection molding techniques and having predictable finished dimensions, good heat resistance, and good room temperature and low temperature impact resistance. Such properties are particularly desired for exterior automotive body panel applications such as door panels and fascia, or other automotive applications such as instrument panels, fenders, hoods, trunk lids, side cladding parts, mirror housings, cowl vent grills, etc. These compositions can even find use in instrument housings such as for power tools or information technology equipment such as telephones, computers, copiers, hand held computers, personal data assistants, cell phones, etc.

DETAILED DESCRIPTION OF THE EMBODIMENTS

Suitable carbonate polymers employed in the present invention are well known in the literature and can be prepared by known techniques, for example several suitable methods are disclosed in U.S. Pat. Nos. 3,028,365, 4,529,791, and 4,677,162, which are hereby incorporated by reference in their entirety. In general, carbonate polymers can be prepared from one or more multihydric compounds by reacting the multihydric compounds, preferably an aromatic dihydroxy compound such as a diphenol, with a carbonate precursor such as phosgene, a haloformate or a carbonate ester such as diphenyl or dimethyl carbonate. Preferred diphenols are 2,2-bis(4-hydroxyphenyl)-propane, 1,1-bis(4-hydroxyphenyl)-1-phenylethane, 3,3-bis(para-hydroxyphenyl)-phthalide and bishydroxyphenylfluorene. The carbonate polymers can be prepared from these raw materials by any of several known processes such as the known interfacial, solution or melt processes. As is well known, suitable chain terminators and/or branching agents can be employed to obtain the desired molecular weights and branching degrees.

It is understood, of course, that the carbonate polymer may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Thus, included in the term "carbonate polymer" are the poly(ester-carbonates) of the type described in U.S. Pat. No. 3,169,121, 4,156,069, and 4,260, 731, which are hereby incorporated by reference in their entirety. Also suitable for the practice of this invention are blends of two or more of the above carbonate polymers. Of the aforementioned carbonate polymers, the polycarbonates of bisphenol-A are preferred.

As compared to linear carbonate polymers having otherwise similar melt flow rates (melt viscosity at low shear conditions) branched carbonate polymers are known to be more shear sensitive, exhibiting significantly decreased viscosity at higher shear processing conditions. In general, it has been found that the branched carbonate polymer is sufficiently branched if it has a higher degree of "shear thinning" than a linear carbonate polymer of the same molecular weight and will preferably provide a higher degree of "shear thinning" in the final polymer blend composition at an appropriate level of incorporation. It has been found that branched components with higher degrees of branching will provide shear sensitivity improvements at lower levels while lower degrees of branching will conversely require use of the component in larger amounts to provide shear sensitivity improvements.

Preferably, the carbonate polymer of the present invention is an aromatic carbonate polymer, more preferably a branched carbonate polymer and most preferably a branched aromatic carbonate polymer. Branched aromatic carbonate polymers suitable for use in the present invention can be prepared by techniques known in the literature such as the known interfacial, solution or melt processes. Suitable types and amounts of chain terminators (typically monophenolic compounds) and/or branching agents (typically phenols having three or more hydroxy or condensation reactive groups) can be employed to obtain the desired molecular weight and branching degrees in the branched component. Suitable branching agents are generally one or more of the following: phloroglucin; phloroglucid; 2,6-dimethyl-2,4,6-tri(4-hydroxyphenyl)heptene-3; 4,6-dimethyl-2,4,6-tri(4-hydroxyphenyl)heptene-2; 4,6-dimethyl-2,4,6-tri(4-hydroxyphenyl)pentene-2; 4,6-dimethyl-2,4,6-tri(4-hydroxyphenyl)pentane; 1,3,5-tri(4-hydroxyphenyl) benzene; 1,3,5-tri(2-hydroxyphenyl)benzol; 1,1,1-tri(4-hydroxyphenyl)ethane; 2,6-bis(2-hydroxy-5-methylbenzyl)-4-methylphenol; tetra(4-hydroxy-phenyl)methane; trisphenol; bis(2,4-dihydroxyphenyl)ketone; 1,4-bis(4,4-dihydroxytriphenylmethyl)benzene; $\alpha,\alpha',\alpha''$-tri(4-hydroxyphenyl)-1,3,5-tri-isopropylbenzene; 3,3-bis(4-hydroxyaryl)oxyindole; isatinbisphenol; 5-chloroisatin; 5,7-dichloroisatin; 5-bromoisatin; trimellitic acid; pyromellitic acid; benzophenonetetracarboxylic acid; and including for the appropriate compounds, the acid chlorides or other condensation reactive derivatives thereof such as trimellitic trichloride, trimesoylchloride and trimellitic anhydride chloride. Specifically preferred branching agents include phloroglucin; phloroglucid; 1,1,1-tri(4-hydroxyphenyl)ethane; trimellitic acid; trimellitic trichloride; pyromellitic acid; benzophenonetetracarboxylic acid and acid chlorides thereof; 2,6-bis(2-hydroxy-5-methylbenzyl)-4-methylphenol and 1,3,5-tri(4-hydroxyphenyl)benzene.

The branched aromatic carbonate polymer according to the present invention can be prepared (a) directly from a polymerization process (b) by the blending of two or more separately prepared carbonate polymer components, (c) by the addition of one or more previously prepared carbonate polymer into the reaction process that is preparing or has prepared the other carbonate polymer, (d) by the appropriate operation of a sequence or series of reactors to prepare one or more linear or branched carbonate polymer in the presence of the previously prepared other carbonate polymer prior to the recovery of the carbonate polymer from the reaction mixture or (e) the appropriate operation of parallel reactors to prepare one or more linear and branched carbonate polymers followed by combining the unrecovered reaction products prior to the recovery of the carbonate polymer blend from the reaction mixture.

Preferably, the branched aromatic carbonate polymer is a combination of two or more branched carbonate polymer components of different molecular weights and different melt flow rates that are blended to obtain the desired degree of branching, intermediate molecular weight and melt flow rate branched aromatic carbonate polymer. Most preferably, the carbonate polymer of this invention comprises a branched aromatic carbonate polymer that is a combination of one or more branched carbonate polymer components having different molecular weights and different melt flow rates with one or more linear carbonate polymer components having different molecular weights and different melt flow rates to obtain the desired degree of branching, intermediate molecular weight and melt flow rate branched aromatic carbonate polymer. This type of system of blending carbonate polymer components of different molecular weights and different melt flow rates is practiced commercially to provide a broader range of polycarbonate resins of differing melt flow rate while reducing the overall number of different products the production facility must supply.

Unless otherwise indicated, the references to "molecular weight" herein refer to weight average molecular weights ($M_w$) determined on the aromatic carbonate polymers using gel permeation chromatography with a bisphenol A polycarbonate standard. Otherwise, viscometry or light scattering can also be used to determine weight average molecular weight if similar results are obtained. It should be noted that various references refer to "viscosity average" molecular weight ($M_v$), which is not the same as "weight average" molecular weight but can be correlated or converted to $M_w$ values.

In general, the branched carbonate polymer component useful for blending with the linear carbonate polymer component should have a weight average molecular weight of at least about 10,000, preferably at least about 15,000, more preferably at least about 19,000, even more preferably at least about 22,000, even more preferably at least about 28,000 and most preferably at least about 32,000. It has been found that the weight average molecular weight of the branched carbonate polymer component useful for blending with the linear carbonate polymer component should not be higher than about 45,000, preferably not higher than about 39,000, preferably not higher than about 36,000, most preferably not higher than about 32,000.

It has been found that the branched carbonate polymer component useful for blending with the linear carbonate polymer component should have a melt flow rate (MFR), determined under conditions of 300° C. and an applied load of 1.2 kilogram (300° C./1.2 kg), of at least about 0.1 grams per 10 minutes (g/10 min.), preferably at least about 1 g/10 min., more preferably at least about 2 g/10 min., even more preferably at least about 2.5 g/10 min., even more preferably at least about 3 g/10 min., and most preferably at least about 3.5 g/10 min. and preferably no more than about 40 g/10 min., preferably no more than about 22 g/10 min., more preferably no more than about 14 g/10 min., even more preferably no more than about 10 g/10 min. and most preferably no more than about 5 g/10 min. Unless otherwise stated, conditions for carbonate polymer melt flow rate determinations are 300° C./1.2 kg.

In general, the linear carbonate polymer component for blending with branched carbonate polymer component are known in the literature and commercially available. It has been found that the linear carbonate polymer component for blending with the branched carbonate polymer component should have a weight average molecular weight of at least about 10,000, preferably at least about 15,000, more preferably at least about 19,000, even more preferably at least about 22,000 and most preferably at least about 28,000. Further, it has been found that the linear carbonate polymer component for blending with the branched carbonate polymer component should have a weight average molecular weight of no more than about 45,000, preferably no more than about 39,000, more preferably no more than about 36,000, even more preferably no more than about 32,000, most preferably no more than about 28,000. When more than one linear carbonate polymer component is used, a preferred weight average molecular weight range for a first linear carbonate polymer component is from about 15,000 to about 24,000, for a second linear carbonate polymer component it is from about 28,000 to about 45,000 and for a third linear carbonate polymer component it is from about 24,000 to about 28,000.

It has been found that the linear carbonate polymer component for blending with the branched carbonate polymer component should have a melt flow rate of at least about 1.2 g/10 min., preferably at least about 2 g/10 min., preferably at least about 2.5 g/10 min., more preferably at least about 3 g/10 min., more preferably at least about 3.5 g/10 min., even more preferably at least about 5 g/10 min. and most preferably at least about 10.0 g/10 min. and preferably no more than about 200 g/10 min., preferably no more than about 80 g/10 min., more preferably no more than about 40 g/10 min., more preferably no more than about 22 g/10 min. and most preferably no more than about 14 g/10 min. When more than one linear carbonate polymer component is used, a preferred melt flow rate range for a first linear carbonate polymer component is from about 40 g/10 min. to about 200 g/10 min., for a second linear carbonate polymer component it is from about 1 g/10 min. to about 15 g/10 min. and for a third linear carbonate polymer component it is from about 15 g/10 min. to about 40 g/10 min.

In general, when blended with a linear carbonate polymer component it has been found suitable to employ the branched carbonate polymer component in an amount (based on linear plus branched carbonate polymer components) of at least about 5 weight percent, desirably at least about 10 weight percent, preferably at least about 20 weight percent, more preferably at least about 30 weight percent, even more preferably at least about 40 weight percent and most preferably at least about 50 weight percent, said weight percentages being based upon total amount of the linear and branched carbonate polymer components. In order to maintain processability and thermoplasticity, the branched carbonate polymer component is employed in amounts less than or equal to about 95 weight percent, desirably less than or equal to about 90 weight percent, preferably less than or equal to about 80 weight percent, even more preferably less than or equal to about 70 weight percent, even more preferably less than or equal to about 60 weight percent and most preferably less than or equal to about 50 weight percent, said weight percentages being based upon total amount of the linear and branched carbonate polymer components. As mentioned above, the level of branching in the branched carbonate polymer component affects the level of branched carbonate polymer necessary to provide the desired degree of shear sensitivity in the claimed polymer blend compositions. The amounts of branched carbonate polymer can, therefore, be optimized for particular levels of branching in the branched aromatic carbonate polymer.

Further, when more than one branched carbonate polymer component is used, preferred ranges for a first component is from about 60 to 95 weight percent, for a second component from about 40 to about 5 weight percent and for a third component from about 40 to about 5 weight percent wherein weight percents are based on the combined weights of the branched carbonate polymer components. Moreover, when more than one linear carbonate polymer component is used, preferred ranges for a first component is from about 60 to 95 weight percent, for a second component from about 40 to about 5 weight percent and for a third component from about 40 to about 5 weight percent wherein weight percents are based on the combined weights of the linear carbonate polymer components.

One of the key features of the polymer blend composition according to the present invention and suitable for use in the processes and articles according to the present invention is that the branched aromatic carbonate polymer has a weight average molecular weight within the desired range. For purposes of obtaining desired processability during molding and impact resistance in the final molded parts, it has been found that the branched aromatic carbonate polymer should have a weight average molecular weight of at least about 17,500, preferably at least about 19,000, more preferably at least about 22,000 and most preferably at least about 25,000. Further, it has been found that the branched aromatic carbonate polymer of the present invention should have a weight average molecular weight of no more than about 36,000, preferably no more than about 32,000, more preferably no more than about 28,000, more preferably no more than about 26,500 most preferably no more than about 26,000.

Further, it has been found that the branched aromatic carbonate polymer of the present invention preferably has a melt flow rate equal to or greater than about 2 g/10 min., more preferably equal to or greater than about 5 g/10 min., more preferably equal to or greater than about 10 g/10 min., even more preferably equal to or greater than about 15 g/10 min. and most preferably equal to or greater than about 20 g/10 min. Generally, the melt flow rate of the branched aromatic carbonate polymer is equal to or less than about 80 g/10 min., preferably equal to or less than about 60 g/10 min., more preferably less than or equal to about 40 g/10 min., more preferably less than or equal to about 30 g/10 min. and most preferably equal to or less than about 20 g/10 min.

Generally, the presence and degree of branching can be determined in the branched aromatic carbonate polymer by measuring the concentration of reacted branching agent in the branched carbonate polymer. The concentration of reacted branching agent in the branched aromatic carbonate polymer can typically be determined by IR or NMR spectroscopy or by liquid chromatography, depending upon the nature of the branching agent. It has been found that levels of reacted branching agent in the branched aromatic carbonate polymer for use in the present invention should be equal to or greater than about 0.0005 weight percent, preferably equal to or greater than about 0.005 weight percent, more preferably equal to or greater than about 0.01 weight percent, even more preferably equal to or greater than about 0.1 weight percent and most preferably equal to or greater than about 0.5 weight percent based on the weight of the branched aromatic carbonate polymer. It has been found that levels of reacted branching agent in the branched aromatic carbonate polymer for use in the present invention should be equal to or less than about 10 weight percent, preferably equal to or less than about 5 weight percent, more preferably equal to or less than about 2.5 weight percent, even more preferably less than or equal to about 1 weight percent and most preferably less than or equal to about 0.6 weight percent based on the weight of the branched aromatic carbonate polymer.

Measurements of shear sensitivity can be done by standard techniques with oscillatory shear rheometry using a Dynamic Mechanical Spectrometer (DMS) or by steady state capillary rheometry using a capillary rheometer. In particular, a fairly standard measurement technique for shear sensitivity of carbonate polymers involves measuring the apparent viscosity at different apparent shear rates in a capillary rheometer in a shear rate range of 15 to 500 inverse seconds (s−1) and/or measuring the complex viscosity at different frequencies in a frequency range of 0.1 to 100 radians per second (rad/s) by DMS (Dynamic Mechanical Spectroscopy) at a temperature of 280° C.

As initially published by W. P. Cox and E. H. Merz in the Journal of Polymer Science Vol. XXVIII, Issue nr 118 (1958), pp. 619–622, there is a correlation and general equivalence between DMS and capillary rheometry to evaluate the shear sensitivity and melt strength/viscosity properties of a polymer.

To quantify shear sensitivity for practical use over a wide range of shear rates, the complex viscosity at 0.1 rad/s (where "per second" or reciprocal seconds is sometimes written as "s$^{-1}$") from the DMS analysis can be divided by the apparent viscosity at 450 s$^{-1}$ from the capillary data. Using this viscosity ratio number, it can be seen that the shear sensitivity properties of the compositions of the present invention are improved compared to those of branched polycarbonates of the same processability (viscosity value at high shear rate) or the same melt strength (viscosity value at low shear rate). An increase of 10% in this viscosity ratio number compared to the comparative resin, is found to be significant with respect to improving the property balance of the resin, particularly melt strength.

The branched aromatic carbonate polymer of the present invention is present in an amount equal to or greater than about 10 weight percent, preferably equal to or greater than about 20 weight percent, more preferably equal to or greater than about 30 weight percent, even more preferably equal to or greater than about 40 weight percent, and most preferably equal to or greater than about 50 weight percent based on the weight of the polymer blend composition. The branched aromatic carbonate polymer of the present invention is present in an amount equal to or less than about 90 weight percent, preferably equal to or less than about 80 weight percent, more preferably equal to or less than about 70 weight percent, even more preferably equal to or less than about 60 weight percent, and most preferably equal to or less than about 50 weight percent based on the weight of the polymer blend composition.

Suitable rubber-modified copolymers employed in the present invention comprise a monovinylidene aromatic and ethylenically unsaturated nitrile copolymer in a matrix or continuous phase and rubber particles dispersed in the matrix. The matrix or continuous phase of the present invention is a copolymer comprising polymerized therein a monovinylidene aromatic monomer and an ethylenically unsaturated nitrile monomer or a copolymer comprising polymerized therein a monovinylidene aromatic monomer, an ethylenically unsaturated nitrile monomer and one or more vinyl monomer that can be copolymerized with them. Copolymer, as used herein, is defined as a polymer having two or more monomers interpolymerized. These compositions are generically known as SAN-type or SAN since poly(styrene-acrylonitrile) is the most common example.

The weight average molecular weight of the matrix copolymer is typically equal to or greater than about 50,000, preferably equal to or greater than about 80,000, and more preferably equal to or greater than about 100,000. The weight average $M_w$ of the matrix copolymer is typically equal to or less than about 300,000, preferably equal to or less than about to 240,000 and most preferably equal to or less than about 180,000. Molecular weight, unless otherwise specified is weight average molecular weight, is measured by gel permeation chromatography (GPC).

Monovinylidene aromatic monomers include but are not limited to those described in U.S. Pat. Nos. 4,666,987; 4,572,819 and 4,585,825, which are herein incorporated by reference. Preferably, the monomer is of the formula:

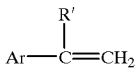

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Preferred monovinylidene aromatic monomers include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

Typically, such monovinylidene aromatic monomer will constitute from an amount equal to or greater than about 50 weight percent, preferably from an amount equal to or greater than about 60 weight percent, more preferably from an amount equal to or greater than about 65 weight percent, and most preferably from an amount equal to or greater than about 70 weight percent based on the total weight of the matrix copolymer. Typically, such monovinylidene aromatic monomer will constitute less than or equal to about 95 weight percent, preferably less than or equal to about 85 weight percent, more preferably less than or equal to about 80 weight percent, and most preferably less than or equal to about 75 weight percent based on the total weight of the matrix copolymer.

Unsaturated nitriles include, but are not limited to, acrylonitrile, methacrylonitrile, ethacrylonitrile, fumaronitrile and mixtures thereof. The unsaturated nitrile is generally employed in the matrix copolymer in an amount equal to or greater than about 5 weight percent, preferably in an amount equal to or greater than about 10 weight percent, more preferably in an amount equal to or greater than about 15 weight percent, and most preferably in an amount equal to or greater than about 20 weight percent based on the total weight of the matrix copolymer. The unsaturated nitrile is generally employed in the matrix copolymer in an amount less than or equal to about 50 weight percent, preferably equal to or less than about 45 weight percent, more preferably less than or equal to about 35 weight percent, and most preferably less than or equal to about 25 weight percent based on the total weight of the matrix copolymer.

Other vinyl monomers may also be included in polymerized form in the matrix copolymer, including conjugated 1,3 dienes (e.g. butadiene, isoprene, etc.); alpha- or beta-unsaturated monobasic acids and derivatives thereof (e.g., acrylic acid, methacrylic acid, etc., and the corresponding esters thereof such as methylacrylate, ethylacrylate, butyl acrylate, methyl methacrylate, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, famaric acid, maleic anhydride, dialkyl maleates or fumarates, such as dimethyl maleate, diethyl maleate, dibutyl maleate, the corresponding famarates, n-phenyl maleimide, etc.; and the like. These additional comonomers can be incorporated in to the composition in several ways including, interpolymerization with the monovinylidene aromatic and ethylenically unsaturated nitrile matrix copolymer and/or polymerization into polymeric components which can be combined, e.g. blended in to the matrix. If present, the amount of such comonomers will generally be equal to or less than about 20 weight percent, more preferably equal to or less than about 10 weight percent and most preferably equal to or less than about 5 weight percent based on the total weight of the matrix copolymer.

The matrix copolymer is present in an amount equal to or greater than about 40 weight percent, preferably equal to or greater than about 50 weight percent, more preferably equal to or greater than about 60 weight percent, even more preferably equal to or greater than about 70 weight percent, and most preferably equal to or greater than about 75 weight percent based on the weight of the rubber-modified copolymer. The matrix copolymer is present in an amount equal to or less than about 95 weight percent, preferably equal to or less than about 90 weight percent, more preferably equal to or less than about 85 weight percent, even more preferably equal to or less than about 80 weight percent, and most preferably equal to or less than about 75 weight percent based on the weight of the rubber-modified copolymer.

The various techniques suitable for producing rubber-modified copolymer are well known in the art. Examples of these known polymerization processes include bulk, mass-solution, or mass-suspension polymerization, these are generally known as mass polymerization processes. See, for example, U.S. Pat. Nos. 3,660,535; 3,243,481 and 4,239,863, which are incorporated herein by reference.

In general continuous mass polymerization techniques are advantageously employed in preparing the rubber-modified monovinylidene aromatic copolymer of the present invention. Preferably, the polymerization is conducted in one or more substantially linear, stratified flow or so-called "plug-flow" type reactor such as described in U.S. Pat. No. 2,727,884, which may or may not comprise recirculation of a portion of the partially polymerized product or, alternatively, in a stirred tank reactor wherein the contents of the reactor are essentially uniform throughout, which stirred tank reactor is generally employed in combination with one or more "plug-flow" type reactors. The temperatures at which polymerization is most advantageously conducted are dependent on a variety of factors including the specific initiator and type and concentration of rubber, comonomers and reaction diluent, if any, employed. In general, polymerization temperatures from 60 to 160° C. are employed prior to phase inversion with temperatures from 100 to 190° C. being employed subsequent to phase inversion. Mass polymerization at such elevated temperatures is continued until the desired conversion of monomers to polymer is obtained. Generally, conversion of from 65 to 90, preferably 70 to 85, weight percent of the monomers added to the polymerization system (i.e., monomer added in the feed and any additional stream, including any recycle stream) to polymer is desired.

Following conversion of a desired amount of monomer to polymer, the polymerization mixture is then subjected to conditions sufficient to cross-link the rubber and remove any unreacted monomer. Such cross-linking and removal of unreacted monomer, as well as reaction of diluent, if employed, and other volatile materials is advantageously conducted employing conventional devolatilization techniques, such as introducing the polymerization mixture into a devolatilizing chamber, flashing off the monomer and other volatiles at elevated temperatures, e.g., from 200 to 300° C., under vacuum and removing them from the chamber.

Alternatively, a combination of mass and suspension polymerization techniques are employed. Using said techniques, following phase inversion and subsequent size stabilization of the rubber particles, the partially polymerized product can be suspended with or without additional monomers in an aqueous medium which contains a polymerized initiator and polymerization subsequently completed. The rubber-modified monovinylidene aromatic copolymer is subsequently separated from the aqueous medium by acidification, centrifugation or filtration. The recovered product is then washed with water and dried.

Various rubbers are suitable for use in the present invention. The rubbers include diene rubbers, ethylene propylene rubbers, ethylene propylene diene (EPDM) rubbers, acrylate rubbers, polyisoprene rubbers, halogen containing rubbers, and mixtures thereof. Also suitable are interpolymers of rubber-forming monomers with other copolymerizable monomers.

Preferred rubbers are diene rubbers such as polybutadiene, polyisoprene, polypiperylene, polychloroprene, and the like or mixtures of diene rubbers, i.e., any rubbery polymers of one or more conjugated 1,3-dienes, with 1,3-butadiene being especially preferred. Such rubbers include homopolymers and copolymers of 1,3-butadiene with one or more copolymerizable monomers, such as monovinylidene aromatic monomers as described hereinabove, styrene being preferred. Preferred copolymers of 1,3-butadiene are block or tapered block rubbers of at least about 30 weight percent 1,3-butadiene rubber, more preferably from about 50 weight percent, even more preferably from about 70 weight percent and most preferably from about 90 weight percent 1,3-butadiene rubber, and up to about 70 weight percent monovinylidene aromatic monomer, more preferably up to about 50 weight percent, even more preferably up to about 30 weight percent, and most preferably up to about 10 weight percent monovinylidene aromatic monomer, weights based on the weight of the 1,3-butadiene copolymer.

Linear block copolymers can be represented by one of the following general formulas:

$$S-B;$$

$$S_1-B-S_2;$$

$$B_1-S_1-B_2-S_2;$$

In which S, $S_1$, and $S_2$ are non-elastic polymer blocks of a monovinylidene aromatic monomer, with equal or different molecular weights and B, $B_1$, and $B_2$ are elastomeric polymer blocks based on a conjugated diene, with equal or different molecular weights. In these linear block copolymers, the non-elastic polymer blocks have a molecular weight of between 5,000 and 250,000 and the elastomeric polymer blocks have a molecular weight of between 2,000 and 250,000. Tapered portions can be present among the polymer blocks, S, $S_1$, and $S_2$ and B, $B_1$, and $B_2$. In the tapered portion the passage between the blocks B, $B_1$, and $B_2$ and S, $S_1$, and $S_2$ can be gradual in the sense that the proportion of monovinylidene aromatic monomer in the diene polymer increases progressively in the direction of the non-elastomeric polymer block, whereas the portion of conjugated diene progressively decreases. The molecular weight of the tapered portions is preferably between 500 and 30,000. These linear block copolymers are described for example in U.S. Pat. No. 3,265,765 and can be prepared by methods well known in the art. Further details on the physical and structural characteristics of these copolymers are given in B. C. Allport et al. "Block Copolymers", Applied Science Publishers Ltd., 1973.

The rubbers preferably employed in the practice of the present invention are those polymers and copolymers which exhibit a second order transition temperature, sometimes referred to as the glass transition temperature ($T_g$), for the diene fragment which is not higher than 0° C. and preferably not higher than −20° C. as determined using conventional techniques, e.g. ASTM Test Method D 746-52 T. $T_g$ is the temperature or temperature range at which a polymeric material shows an abrupt change in its physical properties, including, for example, mechanical strength. $T_g$ can be determined by differential scanning calorimetry (DSC).

The rubber in the rubber-modified copolymer of the present invention is present in an amount equal to or greater than about 5 weight percent, preferably equal to or greater than about 10 weight percent, more preferably equal to or greater than about 15 weight percent, even more preferably equal to or greater than about 20 weight percent, and most preferably equal to or greater than about 25 weight percent based on the weight of the rubber-modified copolymer. The rubber in the rubber-modified copolymer of the present invention is present in an amount equal to or less than about 60 weight percent, preferably equal to or less than about 50 weight percent, more preferably equal to or less than about 40 weight percent, even more preferably equal to or less than about 30 weight percent, and most preferably equal to or less than about 25 weight percent based on the weight of the rubber-modified copolymer.

The rubber dispersed in the matrix copolymer comprises (1) a branched rubber component and optionally, (2) a linear rubber component. Branched rubbers, as well as methods for their preparation, are known in the art. Representative branched rubbers and methods for their preparation are described in Great Britain Patent No. 1,130,485 and in *Macromolecules*, Vol. II, No. 5, pg. 8, by R. N. Young and C. J. Fetters.

A preferred branch rubber is a radial or star-branched polymer, commonly referred to as polymers having designed branching. Star-branched rubbers are conventionally prepared using a polyfunctional coupling agent or a polyfunctional initiator and have three or more polymer segments sometimes referred to as arms, preferably between three to eight arms, bonded to a single polyfunctional element or compound, represented by the formula (rubber polymer segment$)_k$Q wherein preferably, k is an integer from 3 to 8, and Q is a moiety of a polyfunctional coupling agent. Organometallic anionic compounds are preferred polyfunctional initiators, particularly lithium compounds with $C_{1-6}$ alkyl, $C_6$ aryl, or $C_{7-20}$ alkylaryl groups. Tin-based and polyfunctional organic coupling agents are preferably employed; silicon-based polyfunctional coupling agents are most preferably employed.

The arms of the star-branched rubber are preferably one or more 1,3-butadiene rubber, more preferably they are all the same type of 1,3-butadiene rubber, i.e., 1,3-butadiene tapered block copolymer(s), 1,3-butadiene block copolymer (s) or 1,3-butadiene homopolymer(s) or a combination thereof. A star-branched rubber with such a structure may be represented by the formula $$X_m Y_n Z_o Q \quad (1)$$

wherein X is one or more 1,3-butadiene tapered block copolymer, Y is one or more 1,3-butadiene block copolymer and Z is one or more 1,3-butadiene homopolymer, Q is a moiety of a polyfunctional coupling agent and m, n, and o are independently integers from 0 to 8 wherein the sum of m+n+o is equal to the number of groups of the polyfunctional coupling agent and is an integer from at least 3 to 8.

Preferred star-branched rubbers are represented by formula (1) wherein m is equal to zero, e.g., $Y_n Z_o Q$. More preferred are star-branched rubbers represented by formula (1) wherein m is equal to zero and n and o are integers equal to or greater than about 1 and less than or equal to about 3 and the sum of n+o is equal to about 4, for example $Y_2 Z_2 Q$, $Y_1 Z_3 Q$, and $Y_3 Z_1 Q$. Even more preferably, all of the arms of the star-branched rubber are the same type of rubber, i.e., all 1,3-butadiene tapered block copolymers, e.g., $X_m Y_n Z_o Q$ wherein n and o are equal to zero, more preferably all 1,3-butadiene block copolymers e.g., $X_m Y_n Z_o Q$ wherein m and o are equal to zero and most preferably all 1,3-butadiene homopolymers, e.g., $X_m Y_n Z_o Q$ wherein m and n are equal to zero.

A more preferred star-rubber has about four arms of 1,3-butadiene represented by the formula $X_m Y_n Z_o Q$ wherein Z is one or more 1,3-butadiene homopolymer, Q is a moiety of a tetrafunctional coupling agent, m and n are equal to zero, and o is equal to about 4. Further, a more preferred star-rubber has about four arms of 1,3-butadiene represented by the formula $X_m Y_n Z_o Q$ wherein Y is a 1,3-butadiene and styrene block copolymer, Z is one or more 1,3-butadiene homopolymer, Q is a moiety of a tetrafunctional coupling agent, m is equal to zero, n is equal to about 1, and o is equal to about 3. Moreover, a most preferred star-rubber has about six arms of 1,3-butadiene represented by the formula $X_m Y_n Z_o Q$ wherein Y is one or more 1,3-butadiene and styrene block copolymer, Z is one or more 1,3-butadiene homopolymer, Q is a moiety of a hexafunctional coupling agent, m is equal to zero, the sum of n and o is equal to about 6.

When m and/or n are not equal to zero, styrene and butadiene are the preferred comonomers comprising the tapered block copolymer and/or block copolymer arms of the star-branched rubber. Tapered block copolymer arms and/or block copolymer arms may be attached to the polyfunctional coupling agent through a styrene block. Alternatively, tapered block copolymer arms and/or block copolymer arms may be attached to the polyfunctional coupling agent through a butadiene block.

Methods for preparing star-branched or radial polymers having designed branching are well known in the art. Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264, 749; 3,668,263 and 3,787,510, all of which are herein incorporated by reference. Other star-branched rubbers useful in the composition of the present invention include those taught in U.S. Pat. No. 3,280,084 and U.S. Pat. No. 3,281,383, which are incorporated herein by reference.

The branched rubber in the rubber-modified copolymer of the present invention is present in an amount equal to or greater than about 10 weight percent, preferably equal to or greater than about 20 weight percent, more preferably equal to or greater than about 30 weight percent, even more preferably equal to or greater than about 40 weight percent and most preferably equal to or greater than about 50 weight percent based on the total weight of the rubber in the rubber-modified copolymer. The branched rubber of the rubber-modified copolymer of the present invention is present in an amount equal to or less than about 100 weight percent, preferably equal to or less than about 90 weight percent, more preferably equal to or less than about 80 weight percent, more preferably equal to or less than about 70 weight percent, even more preferably equal to or less than about 60 weight percent, and most preferably equal to or less than about 50 weight percent based on the total weight of the rubber in the rubber-modified copolymer.

Linear rubbers, as well as methods for their preparation, are well known in the art. The term "linear rubber" refers to straight chains of polymerized monomer or comonomers which include uncoupled and dicoupled rubber wherein one or two polymeric segments or arms have been attached to a multifunctional coupling agent represented by the formula (rubber polymer segment$)_k$Q wherein k is an integer from 1 to 2. The rubber polymer segments in a dicoupled linear rubber having the formula (rubber polymer segment$)_2$Q, can be the same type, i.e., both 1,3-butadiene homopolymers, more preferably 1,3-butadiene taper block copolymers, and most preferably 1,3-butadiene block copolymers, or they can be different, for example, one rubber polymer segment can be a 1,3-butadiene homopolymer and the other polymer segment a 1,3-butadiene block copolymer. Preferably, the linear rubber is one or more 1,3-butadiene homopolymer, more preferably one or more 1,3-butadiene tapered block copolymer, most preferably one or more 1,3-butadiene block copolymer or combinations thereof. The preferred comonomers comprising the tapered block copolymer and/or block copolymer linear rubber are styrene and butadiene.

If present, the linear rubber of the rubber-modified copolymer of the present invention is present in an amount equal to or less than about 90 weight percent, preferably equal to or less than about 80 weight percent, more preferably equal to or less than about 70 weight percent, even more preferably equal to or less than about 60 weight percent, and most preferably equal to or less than about 50 weight percent based on the total weight of the rubber in the rubber-modified copolymer. The linear rubber in the rubber-modified copolymer of the present invention is present in an amount equal to or greater than about 1 weight percent, preferably equal to or greater than about 10 weight percent, more preferably equal to or greater than about 20 weight percent, more preferably equal to or greater than about 30 weight percent, even more preferably equal to or greater than about 40 weight percent and most preferably equal to or greater than about 50 weight percent based on the total weight of the rubber in the rubber-modified copolymer.

In addition, the rubber-modified copolymer may also optionally contain one or more additives that are commonly used in polymers of this type. Preferred additives of this type include, but are not limited to: stabilizers, antioxidants, impact modifiers, plasticizers, such as mineral oil, antistats, flow enhancers, mold releases, etc. If used, such additives may be present in an amount from at least about 0.01 percent by weight, preferably at least about 0.1 percent by weight, more preferably at least about 1 percent by weight, more preferably at least about 2 percent by weight, and most preferably at least about 5 percent by weight based on the weight of the polymer blend composition. Generally, the additive is present in an amount less than or equal to about 25 percent by weight, preferably less than or equal to about 20 percent by weight, more preferably less than or equal to about 15 percent by weight, more preferably less than or equal to about 12 percent by weight, and most preferably less than or equal to about 10 percent by weight based on the weight of the polymer blend composition.

Preferably, a low molecular weight additive having a surface tension of less than 30 dynes/cm (ASTM D1331, 25° C.) is included in the rubber-modified copolymer. In particular, a low molecular weight silicone oil is used to improve impact properties as described in U.S. Pat. No. 3,703,491, which is herein incorporated by reference. Preferably, the silicone oil is polydimethylsiloxane having a viscosity of from 5 to 1000 centipoise (cps), preferably from 25 to 500 cps. The composition typically contains the low molecular weight silicone oil from 0.01 to 5.0 weight percent, based on the total weight of the rubber-modified copolymer, preferably from 0.1 to 2.0 weight percent. The effect of such silicone oil is enhanced by the incorporation of other additives such as wax and tallow, wherein each is also incorporated at a level of from 0.5 to 1.5 weight percent, based on the total weight of the rubber-modified copolymer. Alternatively, fluorinated compounds such as a perfluoropolyether or a tetrafluoroethylene polymer can be used as the low molecular weight additive. Mixtures of such additives can also be used.

Advantageously the cis content of the branched and linear rubbers will be independently equal to or less than 75 percent, preferably equal to or less than 55 percent, and most preferably equal to or less than 50 percent as determined by conventional IR.

Preferably, branched rubbers according to the present invention have relatively high average molecular weights and have relatively low solution viscosities (less than 60 cps, 5 weight percent solution in styrene at 25° C.) and high Mooney viscosities (greater than 35). Mooney viscosity is determined under standard conditions in accordance with ASTM D 1646 and is reported as X-ML$_{1+4}$ at 100° C. where X is the measured number, M is the Mooney unit, L designates the rotor size (large), 1 is the time in minutes the specimen is allowed to heat in the viscometer, 4 is the time in minutes at which reading X was taken and 100° C. is the test temperature.

Preferably, the molecular weight of the branched rubber, as determined by GPC using laser scattering techniques, is equal to or greater than about 60,000; more preferably equal to or greater than about 90,000, even more preferably equal to or greater than about 120,000, and most preferably equal to or greater than about 180,000. The molecular weight of the branched rubber is preferably less than or equal to about 300,000, more preferably less than or equal to about 260,000, even more preferably less than or equal to about 230,000, and most preferably less than or equal to 200,000.

Preferably, the molecular weight of the linear rubber, as determined by GPC with a refractive index detector and polystyrene standards, is equal to or greater than about 140,000, more preferably equal to or greater than about 160,000, more preferably equal to or greater than about 180,000, and most preferably equal to or greater than about 200,000. The molecular weight of the linear rubber is preferably less than or equal to about 400,000, more preferably less than or equal to about 300,000, more preferably less than or equal to about 250,000, and most preferably less than or equal to 200,000.

Generally, the solution viscosity of the branched and linear rubbers are independently at least about 5 cps, preferably at least about 10 cps, preferably at least about 15 cps, and most preferably at least about 20 cps. Preferably, the branched and linear rubbers independently have a solution viscosity of less than or equal to about 200 cps, preferably less than or equal to about 100 cps, preferably less than or equal to about 50 cps, and most preferably less than or equal to about 40 cps.

Generally, the $ML_{1+4}$ at 100° C. Mooney viscosities of the branched and linear rubbers are independently at least about 15, preferably at least about 25, preferably at least about 35, and most preferably at least about 45. Preferably, the branched and linear rubbers independently have a Mooney viscosity of less than or equal to about 100, preferably less than or equal to about 85, preferably less than or equal to about 75, and most preferably less than or equal to about 60.

The rubber, with graft and/or occluded polymers if present, is dispersed in the continuous matrix phase as discrete particles. Preferably, the rubber particles comprise a range of sizes having a mono-modal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. The average particle size of the rubber particles is equal to or greater than about 0.01 micrometer ($\mu$m), preferably equal to or greater than about 0.15 $\mu$m, more preferably equal to or greater than about 0.5 $\mu$m, and most preferably equal to or greater than about 0.75 $\mu$m. The average particle size of the rubber particles is equal to or less than 5 $\mu$m, preferably equal to or less than 2.5 $\mu$m, more preferably equal to or less than 1.5 $\mu$m, and most preferably equal to or less than 1 $\mu$m. The volume average diameter can be determined by the analysis of transmission electron micrographs of the compositions containing the particles.

Rubber cross-lining is quantified by the light absorbance ratio (LAR). In the rubber-modified copolymer of the present invention, it is preferred that the rubber particles have a light absorbance ratio preferably equal to or greater than about 1, more preferably equal to greater than about 1.5, and most preferably equal to or greater than about 2. The preferred light absorbance ratio of the rubber particles is less than or equal to about 5, preferably less than or equal to about 4, more preferably less than or equal to about 3, even more preferably less than or equal to about 2.5, and most preferably less than or equal to 2. Light absorbance ratio is the ratio of light absorbance for a suspension of the rubber particles in dimethylformamide to the light absorbance for a suspension of the rubber particles in dichloromethane, as described in the examples hereinbelow.

The light absorbance ratio, which is a measure for degree of crosslinking, is dependent on the amount and kind of the polymerization initiator and the temperature and the residence time at the removal step for the volatile components. It also depends on the types and amounts of the matrix monomers, antioxidant, chain transfer agent, etc. A suitable light absorbance ratio can be set by a person skilled in the art by choosing the appropriate conditions for the production process in accordance with the trial and error method.

The rubber-modified copolymer of the present invention preferably has a melt flow rate, determined under conditions of 220° C. and an applied load of 10 kg, equal to or greater than about 0.1 g/10 min., more preferably equal to or greater than about 1 g/10 min., more preferably equal to or greater than about 5 g/10 min., and most preferably equal to or greater than about 10 g/10 min. Generally, the melt flow rate of the rubber-modified copolymer is equal to or less than about 100 g/10 min., preferably equal to or less than about 50 g/10 min., more preferably less than or equal to about 20 g/10 min., and most preferably equal to or less than about 10 g/10 min.

The rubber-modified copolymer of the present invention is present in an amount equal to or less than about 90 weight percent, preferably equal to or less than about 80 weight percent, more preferably equal to or less than about 70 weight percent, even more preferably equal to or less than about 60 weight percent, and most preferably equal to or less than about 50 weight percent based on the weight of the polymer blend composition. The rubber-modified copolymer of the present invention is present in an amount equal to or greater than about 10 weight percent, preferably equal to or greater than about 20 weight percent, more preferably equal to or greater than about 30 weight percent, even more preferably equal to or greater than about 40 weight percent, and most preferably equal to or greater than about 50 weight percent based on the weight of the polymer blend composition.

The polymer blend composition of the present invention preferably has a melt flow rate, determined under conditions of 230° C. and an applied load of 3.8 kg, equal to or greater than about 0.1 g/10 min., more preferably equal to or greater than about 1 g/10 min., more preferably equal to or greater than about 2 g/10 min., and most preferably equal to or greater than about 4 g/10 min. Generally, the melt flow rate of the polymer blend composition is equal to or less than about 50 g/10 min., preferably equal to or less than about 20 g/10 min., more preferably less than or equal to about 10 g/10 min., and most preferably equal to or less than about 6 g/10 min. Unless otherwise stated, conditions for polymer blend composition melt flow rate determinations are 230° C./3.8 kg.

Optionally, the polymer blend composition comprises an impact modifier. Preferable impact modifiers are rubber materials having a $T_g$ equal to or less than 0° C., preferably equal to or less than −10° C., more preferably equal to or less than −20° C., and most preferably equal to or less than −30° C. Suitable rubbers include polymers such as acrylate rubbers, particularly homopolymers and copolymers of alkyl acrylates having from 4 to 6 carbons in the alkyl group or polyolefin elastomers, particularly copolymers of ethylene, propylene and optionally a nonconjugated diene. In addition, mixtures of the foregoing rubbery polymers may be employed if desired.

Preferably, the impact modifier is a grafted homopolymer or copolymer of butadiene that is grafted with a polymer of styrene and methyl methacrylate. Some of the preferred rubber-containing materials of this type are the known methyl methacrylate, butadiene, and styrene-type (MBS-type) core/shell grafted copolymers having a $T_g$ equal to or less than 0° C. and a rubber content greater than 40 percent, typically greater than 50 percent. They are generally obtained by graft polymerizing styrene and methyl methacrylate and/or equivalent monomers in the presence of a conjugated diene polymer rubber core, preferably a butadiene homo- or co-polymer. The grafting monomers may be added to the reaction mixture simultaneously or in sequence, and, when added in sequence, layers, shells or wart-like appendages can be built up around the substrate latex, or core. The monomers can be added in various ratios to each other.

Other impact modifiers useful in the compositions of this invention are those based generally on a long-chain, hydrocarbon backbone, which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber; chlorosulfonated polyethylene rubber; an olefin polymer or copolymer such as ethylene/propylene copolymer, ethylene/styrene copolymer or ethylene/propylene/diene copolymer, which may be grafted with one or more styrenic monomers; neoprene rubber; nitrile rubber; polybutadiene and polyisoprene.

If used, the impact modifier is preferably present in an amount of at least about 1 percent by weight, preferably at least about 2 percent by weight, more preferably at least about 5 percent by weight, even more preferably at least about 7.5 percent by weight, and most preferably at least about 10 percent by weight based on the weight of the polymer blend composition. Generally, the impact modifier is present in an amount less than or equal to about 30 percent by weight, preferably less than or equal to about 25 percent by weight, more preferably less than or equal to about 20 percent by weight, even more preferably less than or equal to about 15 percent by weight, and most preferably less than or equal to about 10 percent by weight based on the weight of the polymer blend composition.

The polymer blend composition of the present invention can be employed in mixtures, alloys or blends with other polymer and/or copolymer resins, for example, mixtures with polysulfones, polyethers, polyether imide, polyphenylene oxides or polyesters. In addition, the claimed polymer blend compositions may also optionally contain one or more additives that are commonly used in polymer blend compositions of this type. Preferred additives of this type include, but are not limited to: fillers, reinforcements, ignition resistant additives, stabilizers, colorants, antioxidants, antistats, flow enhancers, mold releases, nucleating agents, etc. Preferred examples of additives are fillers, such as, but not limited to talc, clay, wollastonite, mica, glass or a mixture thereof. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer blend compositions against degradation caused by, but not limited to heat, light, and oxygen, or a mixture thereof may be used.

If used, such additives may be present in an amount from at least about 0.01 percent by weight, preferably at least about 0.1 percent by weight, more preferably at least about 1 percent by weight, even more preferably at least about 2 percent by weight, and most preferably at least about 5 percent by weight based on the weight of the polymer blend composition. Generally, the additive is present in an amount less than or equal to about 25 percent by weight, preferably less than or equal to about 20 percent by weight, more preferably less than or equal to about 15 percent by weight, even more preferably less than or equal to about 12 percent by weight, and most preferably less than or equal to about 10 percent by weight based on the weight of the polymer blend composition.

Preparation of the polymer blend compositions of this invention can be accomplished by any suitable mixing means known in the art, including dry blending the individual components and subsequently melt mixing, either directly in the extruder used to make the finished article (e.g., the automotive part), or pre-mixing in a separate extruder (e.g., a Banbury mixer). Dry blends of the compositions can also be directly injection molded without pre-melt mixing.

The polymer blend compositions of this invention are thermoplastic. When softened or melted by the application of heat, the polymer blend compositions of this invention can be formed or molded using conventional techniques such as compression molding, injection molding, gas assisted injection molding, calendering, vacuum forming, thermoforming, extrusion and/or blow molding, alone or in combination. The polymer blend compositions can also be formed, spun, or drawn into films, fibers, multi-layer laminates or extruded sheets, or can be compounded with one or more organic or inorganic substances, on any machine suitable for such purpose. Some of the fabricated articles include exterior automotive body panel applications such as door panels and fascia, or other automotive applications such as instrument panels, fenders, hoods, trunk lids, side cladding parts, mirror housings, cowl vent grills, etc. These compositions can even find use in instrument housings such as for power tools or information technology equipment such as telephones, computers, copiers, hand held computers, personal data assistants, cell phones, etc.

EXAMPLES

To illustrate the practice of this invention, examples of preferred embodiments are set forth below. However, these examples do not in any manner restrict the scope of this invention.

The compositions of Examples 1 to 13 were prepared by mixing polycarbonate resin pellets dried at 120° C. for at least 4 hours, ABS pellets and other additives in a plastic bag. The dry blended mixture was feed to a 30 mm Werner and Pfleider fully intermeshing corotating twin screw extruder. The following were the compounding conditions on the Werner and Pfleider extruder: Barrel temperature profile: 210° C., 240° C., 255° C., 255° C., and 255° C. and Screw speed of 289 rotations per minute (RPM). The extrudate was cooled in the form of strands and comminuted as pellets. The pellets were dried in an air draft oven for 4 hours at 120° C. and then were used to prepare test specimens on a 70 ton Arburg injection molding machine, having the following molding conditions: Barrel temperature of 250° C.; Mold temperature of 79° C.; Injection time of 3 seconds; Holding time of 5 seconds; cooling time of 20 seconds; Holding pressure of 230–40 bar; Back pressure of 2.5 turns; and Screw speed of 3.8.

The compositions of Examples 14 to 16 were prepared by mixing polycarbonate resin pellets, ABS pellets and other additives in a plastic bag. The dry blended mixture was feed to a 30 mm Werner and Pfleider fully intermeshing corotating twin screw extruder. The following were the compounding conditions on the Werner and Pfleider extruder: Barrel temperature profile: all zones were 230° C.; Melt temperature of 250° C. to 255° C.; Screw speed of 250 RPM; Torque of 70 to 80 percent and Feed rate of 50 pounds per hour. The extrudate was cooled in the form of strands and comminuted as pellets. The pellets were dried in an air draft oven for 3 hours at 90° C. and then were used to prepare test specimens on a 70 ton Arburg injection molding machine, having the following molding conditions: Barrel temperature profile: all zones were 220° C.; Melt temperature of 240° C.; Mold temperature of 50° C.; Injection time of 3 seconds; Holding time of 5 seconds; Cooling time of 20 seconds; Cycle time of 30 seconds; Injection pressure of 40 bar; Holding pressure of 30 bar; Back pressure of 5 bar; Injection speed of 4.0; Screw speed of 4.0; and dosage of 15.

Example 1

An ABS resin (33.7 percent) which was mass produced and comprised about 14.8 percent star-branched butadiene homopolymer and 24 percent acrylonitrile having a average rubber particle size of 1.0 micometers was melt blended into a homopolymer of bisphenol-A (66 percent) having a MFR of 10 g/10 min.

Example 2

An ABS resin (33.7 percent) which was mass produced and comprised about 15.9 percent star-branched butadiene homopolymer and 22.7 percent acrylonitrile having a average rubber particle size of 0.65 micometers was melt blended into a homopolymer of bisphenol-A (66 percent) having a MFR of 10 g/10 min.

Example 3

An ABS resin (33.7 percent) which was mass produced and comprised about 15.6 percent star-branched butadiene homopolymer and 22.7 percent acrylonitrile having a average rubber particle size of 0.83 micometers was melt blended into a homopolymer of bisphenol-A (66 percent) having a MFR of 10 g/10 min.

Example 4

An ABS resin (33.7 percent) which was mass produced and comprised about 15.6 percent star-branched butadiene homopolymer and 22.7 percent acrylonitrile having a average rubber particle size of 0.83 micometers was melt blended into a homopolymer of bisphenol-A (66 percent) having a MFR of 14 g/10 min.

Example 5

An ABS resin (33.7 percent) which was mass produced and comprised about 15.6 percent star-branched butadiene homopolymer and 22.7 percent acrylonitrile having a average rubber particle size of 0.83 micometers was melt blended into a homopolymer of bisphenol-A (66 percent) having a MFR of 22 g/10 min.

Example 6

An ABS resin (33.7 percent) which was mass produced and comprised about 17.1 percent star-branched butadiene homopolymer and 22.4 percent acrylonitrile having a average rubber particle size of 0.98 micometers was melt blended into a homopolymer of bisphenol-A (66 percent) having a MFR of 10 g/10 min.

Example 7

An ABS resin (29.7 percent) which was mass produced and comprised about 17.1 percent star-branched butadiene homopolymer and 22.4 percent acrylonitrile having a average rubber particle size of 0.98 micometers was melt blended into a homopolymer of bisphenol-A (70 percent) having a MFR of 10 g/10 min.

Example 8

An ABS resin (44.7 percent) which was mass produced and comprised about 17.1 percent star-branched butadiene homopolymer and 22.4 percent acrylonitrile having a average rubber particle size of 0.98 micometers was melt blended into a homopolymer of bisphenol-A (55 percent) having a MFR of 10 g/10 min.

Example 9

An ABS resin (33.7 percent) which was mass produced and comprised about 9.4 percent star-branched butadiene homopolymer and about 9.4 percent linear styrene and butadiene block copolymer rubber and 20.5 percent acrylonitrile having a average rubber particle size of 1.2 micometers was melt blended into a homopolymer of bisphenol-A (66 percent) having a MFR of 10 g/10 min.

Example 10

An ABS resin (33.7 percent) which was mass produced and comprised about 7.6 percent star-branched butadiene homopolymer and about 7.6 percent linear styrene and butadiene block copolymer rubber and 22.6 percent acrylonitrile having a average rubber particle size of 0.86 micometers was melt blended into a homopolymer of bisphenol-A (66 percent) having a MFR of 10 g/10 min.

Example 11

An ABS resin (33.7 percent) which was mass produced and comprised about 10.6 percent star-branched butadiene homopolymer and about 4.6 percent linear styrene and butadiene block copolymer rubber and 24.4 percent acrylonitrile having a average rubber particle size of 0.81 micometers was melt blended into a homopolymer of bisphenol-A (66 percent) having a MFk of 10 g/10 min.

Example 12

An ABS resin (33.7 percent) which was mass produced and comprised about 10.6 percent star-branched butadiene homopolymer and about 4.6 percent linear styrene and butadiene block copolymer rubber and 24.4 percent acrylonitrile having a average rubber particle size of 0.81 micometers was melt blended into a homopolymer of bisphenol-A (66 percent) having a MFM of 14 g/10 min.

Example 13

An ABS resin (33.7 percent) which was mass produced and comprised about 22.1 percent linear styrene and butadiene block copolymer rubber and 20.2 percent acrylonitrile having a average rubber particle size of 0.81 was melt blended into a homopolymer of bisphenol-A (66 percent) having a MFR of 10 g/10 min.

Example 14

An ABS resin (39.9 percent) which was mass produced and comprised about 7.6 percent star-branched butadiene homopolymer and about 7.6 percent linear styrene and butadiene block copolymer rubber and 22.6 percent acrylonitrile having a average rubber particle size of 0.86 micometers was melt blended with a linear homopolymer of bisphenol-A having a MFR of 80 g/10 min. (41.9 percent), a linear homopolymer of bisphenol-A having a MFR of 3 g/10 min. (5.9 percent) and a branched homopolymer of bisphenol-A having a MFR of 3 g/10 min. (11.9 percent).

Example 15

An ABS resin (39.8 percent) which was mass produced and comprised about 7.6 percent star-branched butadiene homopolymer and about 7.6 percent linear styrene and butadiene block copolymer rubber and 22.6 percent acrylonitrile having a average rubber particle size of 0.86 micometers was melt blended with a linear homopolymer of bisphenol-A having a MFR of 80 g/10 min. (41.7 percent), a linear homopolymer of bisphenol-A having a MFR of 3 g/10 min. (5.9 percent) and a branched homopolymer of bisphenol-A having a MFR of 3 g/10 min. (11.9 percent).

Example 16

An ABS resin (38.9 percent) which was mass produced and comprised about 7.6 percent star-branched butadiene homopolymer and about 7.6 percent linear styrene and butadiene block copolymer rubber and 22.6 percent acrylonitrile having a average rubber particle size of 0.86 micometers was melt blended with a linear homopolymer of bisphenol-A having a MFR of 80 g/10 min. (40.9 percent), a linear homopolymer of bisphenol-A having a MFR of 3 g/10 min. (5.8 percent) and a branched homopolymer of bisphenol-A having a MFR of 3 g/10 min. (11.7 percent).

The formulation content and properties of Examples 1 to 13 are given in Table 1 below in parts by weight of the total composition. In Table 1:

"PC-1" is a linear bisphenol-A polycarbonate homopolymer having a MFR of 10 g/10 min. and commercially available as CALIBRE™ 300 from Dow Chemical;

"PC-2" is a linear bisphenol-A polycarbonate homopolymer having a MFR of 80 g/10 min.;

"PC-3" is a linear bisphenol-A polycarbonate homopolymer having a MFR of 3 g/10 min. and commercially available as CALIBRE 300 from Dow Chemical;

"PC-4" is a branched bisphenol-A polycarbonate homopolymer having a MFR of 3 g/10 min. and about 0.5 weight percent reacted branching agent based on the weight of the branched bisphenol-A polycarbonate homopolymer;

"ABS" is a mass produced acrylonitrile butadiene styrene terpolymer wherein the rubber was dissolved in a feed stream of styrene, acrylonitrile, ethyl benzene, 1 weight percent mineral oil and 0.14 weight percent of di-(tertiarybutyl peroxy) cyclohexane initiator to form a mixture. The mixture was polymerized in a continuous process while agitating said mixture. The polymerization occurred in a multi staged reactor system over an increasing temperature profile. N-dodecylmercaptan was added for molecular weight control. During the polymerization process, some of the forming copolymer grafts to the rubber particles while some of it does not graft, but instead, forms the matrix copolymer. The resulting polymerization product was then devolatilized, extruded, and pelletized;

"MBS" is a methylmethacrylate, butadiene and styrene-type core/shell grafted copolymer available as PARALOID™ 3691A from Rhom and Haas;

"IRGANOX™ 1076" is a phenolic antioxidant available from Ciba Geigy;

"LUBRIL™ JK" is octadecanoic acid, 12-(1-oxooctadecyl)oxy-2-octyldodecyl ester a mold release commercially available from Rhodia;

"GMS" is glycerol mono phosphate commercially available as S-100A from Riken Vitamin, Inc.;

"Star-branched rubber" is a butadiene homopolymer commercially available as BUNA™ HX565 from Bayer having a 5 percent solution viscosity in styrene of 44 cps, a Mooney viscosity of 59, a $M_w$ of 200,000, and a Mn of 110,000;

"Linear rubber" is a 70/30 butadiene/styrene block copolymer commercially available as STEREON™ 730 from Firestone having a 5 percent solution viscosity in styrene of 30 cps, a $M_w$ of less than 182,000, and a Mn of 140,000;

"% AN" is the percent acrylonitrile in the ABS;

"LAR" is the light absorbance ratio determined using a Brinkmann model PC 800 probe colorimeter equipped with a 450 nm wavelength filter, from Brinkmann Instruments Inc., Westbury, N.Y., or equivalent, is used. In a first vial, a 0.4 gram (g) sample of rubber-modified copolymer is dissolved in 40 milliliters (ml) of dimethylformamide (DMF). From the first vial, 5 ml of the resulting DMF solution is added to a second vial containing 40 ml of DMF. From the first vial, 5 ml of the resulting DMF solution is added to a third vial containing 20 ml of dichloromethane (DCM). The probe is zeroed in neat DMF. The absorption of the DMF solution in the second vial and the absorption of the DCM solution in the third vial are determined. The light absorbance ratio is calculated by the following equation:

$$LAR = \frac{(\text{Absorbance of Sample in } DMF)}{(\text{Absorbance of Sample in } DCM)};$$

"$M_w$" is weight average molecular weight measured by gel permeation chromatography. Matrix polymer (e.g., SAN) determinations were made using polystyrene standards with a UV detector set at 254 nanometers and polycarbonate determinations were made using polystyrene and polycarbonate standards with a UV detector set at 228 nanometers;

"particle size" is reported volume-weighted ($D_{43}$) mean particle diameter and was determined by the analysis of transmission electron microscope (TEM) images on samples of the ABS. Samples prepared from polymer pellets cut to fit a microtome chuck. The area for microtomy was trimmed to approximately 1 square millimeter (mm$^2$) and stained in $OsO_4$ vapor overnight at 24° C. Ultrathin sections were prepared using standard microtomy techniques. 90 nanometer thin sections were collected on Cu grids and were studied in one of two transmission electron microscopes: either a Hitachi H-600 TEM operating at 100 kilovolt (KV) or a Philips CM12 TEM operating at 120 KV. The resulting images were analyzed for rubber particle size distribution and rubber gel phase volume using a computer with the NIH Image image analysis software (NIH Image is a public domain computer program developed at the U.S. National Institutes of Health and available on the Internet at http://rsb.info.nih.gov/nih-image/). Images were analyzed at a resolution of 0.007 micrometer/pixel with the features segregated so that the stained rubber was black and the unstained matrix was white. Image artifacts were removed with the editing tools built into the software. Rubber gel sizes were determined by measuring the area of the gel particle, then converting the area to a diameter which is the diameter of a circle with the same area as that observed for the gel particle. The nomenclature used in this work is based primarily on the work of T. Allen ("particle Size Measurement" Vol. 1, Fifth Edition, Terence Allen, 1998, Chapman & Hall) and is summarized by the following single general equation:

$$D_{nm} = \sqrt[(n-m)]{\frac{\sum_{i=1}^{k} N_i \cdot d_i^n}{\sum_{i=1}^{k} N_i \cdot d_i^m}}$$

where $D_{nm}$ is the weighted mean diameter for the distribution, $N_i$ is the number of particles of diameter $d_i$, i runs over all k sizes in the distribution and the $(n-m)^{th}$ root function (i.e., square-root for n−m=2, cube-root for n−m=3, identity function for n−m=1, etc.) is used to assure that the dimensionality of the result is appropriate.

Particle size measurement is sensitive to the TEM sectioning process since the sections do not always run through the center of the observed particles. Although this effect will result in a generally smaller estimate of average particle size than the true value, a consistent approach yields consistent relative results. The sizing method presented hereinabove is practical without the need for assumptions about particle size distribution or accurate measurement of section thickness. Correction for sectioned viewing in either the phase volume determination or the particle size reporting was not made.

The following tests were run on Examples 1 to 13 and the results of these tests are shown in Table 1:

Tensile property testing was done in accordance with ASTM D 638. Tensile Type 1 test specimens were conditioned at 23° C. and 50 percent relative humidity 24 hours prior to testing. Testing was performed using an INSTRON 1125 mechanical tester. Testing was performed at room temperature.

Flexural properties were determined in accordance with ASTM D 790. Testing was performed using an INSTRON mechanical tester. Flexural property test specimens were conditioned at 23° C. and 50 percent relative humidity 24 hours prior to testing. Testing was performed at room temperature.

Deflection temperature under load (DTUL) was determined on a Ceast HDT 300 Vicat machine in accordance with ASTM D 648-82 where test specimens were unannealed and tested under an applied pressure of 1.82 megapascals (MPa).

Impact resistance as measured by the Notched Izod test (Izod) was determined according to ASTM D 256-90-B at 23° C., −25° C., −29° C., −40° C., and −45° C. Ductile Brittle Transition Temperature (DBTT) was determined at the point where one out of four test specimens had a brittle failure. Specimens were cut from rectangular DTUL bars and measured 3.18 millimeter (mm) in thickness and 50.8 mm in length. The specimens were notched with a TMI 22-05 notcher to give a 0.254 mm radius notch. A 22 kilogram pendulum was used.

Impact resistance as measured by instrumented impact (Dart Impact) was determined according to ASTM D 3763 using a General Research Corp. Dynatup 8250 instrumented impact tester with a 45.4 kg weight. Test results were determined at 23° C. and −29° C. on a 64 mm by 3.18 mm thick disk.

MFR was determined according to ASTM D 1238 on a Tinius Olsen plastometer, for PC resins at 300° C. and an applied load of 1.2 kg and for ABS resins and PC/ABS blends at 230° C. and an applied load of 3.8 kg.

TABLE 1

| Example | 1 | 2 | 3 | 4 | 5 | 6 | 7 | 8 | 9 | 10 | 11 | 12 | 13* |
|---|---|---|---|---|---|---|---|---|---|---|---|---|---|
| BLEND COMPOSITION | | | | | | | | | | | | | |
| % PC-1 | 66 | 66 | 66 | 66 | 66 | 66 | 70 | 55 | 66 | 66 | 66 | 66 | 66 |
| % ABS | 33.7 | 33.7 | 33.7 | 33.7 | 33.7 | 33.7 | 29.7 | 44.7 | 33.7 | 33.7 | 33.7 | 33.7 | 33.7 |
| % Irganox 1076 | 0.2 | 0.2 | 0.2 | 0.2 | 0.2 | 0.2 | 0.2 | 0.2 | 0.2 | 0.2 | 0.2 | 0.2 | 0.2 |
| % Lubril JK | 0.1 | 0.1 | 0.1 | 0.1 | 0.1 | 0.1 | 0.1 | 0.1 | 0.1 | 0.1 | 0.1 | 0.1 | 0.1 |
| PC COMPONENT | | | | | | | | | | | | | |
| MFR (300° C./1.2 kg), g/10 min. | 10 | 10 | 10 | 14 | 22 | 10 | 10 | 10 | 10 | 10 | 10 | 14 | 10 |
| ABS COMPONENT | | | | | | | | | | | | | |
| % Star-branched rubber | 14.8 | 15.9 | 15.6 | 15.6 | 15.6 | 17.1 | 17.1 | 17.1 | 9.4 | 7.6 | 10.6 | 10.6 | 0 |
| % Linear rubber | 0 | 0 | 0 | 0 | 0 | 0 | 0 | 0 | 9.4 | 7.6 | 4.6 | 4.6 | 22.1 |
| % Total Rubber | 14.8 | 15.9 | 15.6 | 15.6 | 15.6 | 17.1 | 17.1 | 17.1 | 18.8 | 15.2 | 15.2 | 15.2 | 22.1 |
| % AN | 24 | 22.7 | 22.7 | 22.7 | 22.7 | 22.4 | 22.4 | 22.4 | 20.5 | 22.6 | 24.4 | 24.4 | 20.2 |
| LAR | 2.08 | 2.50 | 2.65 | 2.65 | 2.65 | 2.35 | 2.35 | 2.35 | 2.92 | 1.99 | 2.33 | 2.33 | 3.50 |
| MFR (230° C./3.8 kg), g/10 min. | 2.3 | 3 | 3.4 | 3.4 | 3.4 | 3.3 | 3.3 | 3.3 | 4.25 | 4.1 | 2.4 | 2.4 | 4.5 |
| $M_w$ | 149000 | 151000 | 150000 | 150000 | 150000 | 154000 | 154000 | 154000 | 140000 | 146000 | 153000 | 153000 | 139000 |
| Particle Size ($D_{43}$), micometers | 1.0 | 0.65 | 0.83 | 0.83 | 0.83 | 0.98 | 0.98 | 0.98 | 1.2 | 0.86 | 0.81 | 0.81 | 0.81 |
| BLEND PROPERTIES | | | | | | | | | | | | | |
| Tensile | | | | | | | | | | | | | |
| Modulus MPa | 2482 | 2620 | 2551 | 2482 | 2551 | 2758 | 2689 | 2413 | 2344 | 2413 | 2482 | 2758 | 2482 |
| Elongation at break, % | 127 | 119 | 129 | 103 | 85 | 124 | 123 | 122 | 59 | 125 | 132 | 123 | 120 |
| Tensile Break, kPa | 53090 | 53779 | 59295 | 49642 | 48263 | 57226 | 57916 | 48953 | 45850 | 55158 | 56537 | 50332 | 50332 |
| Elongation at yield, % | 4.8 | 5 | 5 | 4.9 | 4.9 | 4.7 | 5 | 4.7 | 4.8 | 4.9 | 4.8 | 4.7 | 5.0 |
| Tensile yield, kPa | 56537 | 59295 | 61363 | 58605 | 61363 | 59984 | 61363 | 56537 | 55848 | 58605 | 58605 | 58605 | 58605 |

TABLE 1-continued

| Example | 1 | 2 | 3 | 4 | 5 | 6 | 7 | 8 | 9 | 10 | 11 | 12 | 13* |
|---|---|---|---|---|---|---|---|---|---|---|---|---|---|
| Flexural | | | | | | | | | | | | | |
| Modulus, MPa | 2482 | 2620 | 2689 | 2551 | 2689 | 2827 | 2896 | 2551 | 2413 | 2620 | 2551 | 2620 | 2482 |
| Strength, kPa | 88942 | 91700 | 95148 | 90321 | 94458 | 95837 | 98595 | 89632 | 86874 | 92390 | 90321 | 92390 | 88942 |
| Heat | | | | | | | | | | | | | |
| DTUL at 1.82 MPa, °C. | 106.1 | 104.4 | 107.2 | 107.8 | 104.4 | 105.6 | 110.6 | 101.1 | 105.0 | 107.8 | 106.7 | 105.0 | 105.6 |
| Notch Izod | | | | | | | | | | | | | |
| −23° C., J/m | 646 | 582 | 657 | 593 | 464 | 619 | 630 | 790 | 625 | 614 | 630 | 630 | 571 |
| −29° C., J/m | 502 | 416 | 416 | 326 | 165 | 427 | 459 | 464 | 491 | 470 | 539 | 480 | 379 |
| −40° C., J/m | 518 | 438 | | | | | | | 459 | 518 | 496 | 475 | 374 |
| −45° C., J/m | 475 | | | | | | | | 480 | 454 | 480 | | |
| DBTT | <−45 | −40 | −35 | −32 | −18 | −38 | −38 | −35 | <−45 | <−45 | <−45 | −45 | −40 |
| Dart Impact | | | | | | | | | | | | | |
| 23° C. Peak Energy, J | 54.2 | 53.1 | 53.1 | 50.8 | 48.6 | 56.5 | 58.8 | 46.3 | 48.6 | 49.7 | 55.4 | 53.1 | 46.3 |
| 23° C. Total Energy, J | 59.9 | 58.8 | 57.6 | 55.4 | 53.1 | 62.1 | 63.3 | 52.0 | 55.4 | 59.9 | 59.9 | 58.8 | 53.1 |
| −29° C. Peak Energy, J | 52.0 | 53.1 | 54.2 | 49.7 | 54.2 | 55.4 | 57.6 | 44.1 | 50.8 | 54.2 | 53.1 | 48.6 | 49.7 |
| −29° C. Total Energy, J | 66.7 | 67.8 | 63.3 | 57.6 | 62.1 | 65.5 | 65.5 | 53.1 | 58.9 | 68.9 | 65.5 | 62.1 | 64.4 |
| PC $M_w$ after molding | 28400 | 27900 | 28700 | 26700 | 23100 | 28300 | 28600 | 28200 | 27900 | 28500 | 28700 | 26800 | 25900 |
| Viscosity | | | | | | | | | | | | | |
| MFR (230° C./3.8 kg), g/10 min. | 2.6 | 3 | 2.42 | 3.03 | 5 | 2.35 | 2.26 | 2.56 | 3.3 | 2.9 | 2.5 | 3 | 3.4 |

*not an example of the present invention.

TABLE 2

| | Example | | |
|---|---|---|---|
| | 14 | 15 | 16 |
| BLEND COMPOSITION | | | |
| % PC-2 | 41.9 | 41.7 | 40.9 |
| % PC-3 | 5.9 | 5.9 | 5.8 |
| % PC-4 | 11.9 | 11.9 | 11.7 |
| % ABS | 39.9 | 39.8 | 38.9 |
| % MBS | | | 2.0 |
| % Irganox 1076 | 0.2 | 0.2 | 0.2 |
| % Lubril JK | | 0.1 | 0.1 |
| % GMS | | 0.3 | 0.3 |
| ABS COMPONENT | | | |
| % Star-branched rubber | 7.6 | 7.6 | 7.6 |
| % Linear rubber | 7.6 | 7.6 | 7.6 |
| % Total Rubber | 15.2 | 15.2 | 15.2 |
| % AN | 22.6 | 22.6 | 22.6 |
| LAR | 1.99 | 1.99 | 1.99 |
| MFR (230° C./3.8 kg), g/10 min. | 4.1 | 4.1 | 4.1 |
| $M_w$ | 146000 | 146000 | 146000 |
| Particle Site ($D_{43}$), micrometers | 0.86 | 0.86 | 0.86 |
| BLEND PROPERTIES | | | |
| Tensile | | | |
| Modulus MPa | | | 2100 |
| Elongation at break, % | | | 46.5 |
| Tensile Break, kpa | | | 45 |
| Tensile yield, kpa | | | 57 |
| Flexural | | | |
| Modulus, MPa | 2700 | 2700 | 2600 |
| Heat | | | |
| DTUL at 1.82 MPa, °C. | 97.4 | 97.1 | 99.6 |
| Notch Izod | | | |
| 23° C., J/m | 582 | 566 | 560 |
| −25° C., J/m | | | 471 |
| −40° C., J/m | 197 | 155 | 373 |
| PC $M_w$ after molding | | | 23,600 |
| Viscosity | | | |
| MFR (230° C./3.8 kg), g/10 min. | 5.9 | 5.9 | 5.8 |

What is claimed is:

1. A polymer blend composition comprising, in admixture:
   (a) a branched aromatic carbonate polymer and
   (b) a rubber-modified copolymer comprising
      (i) a continuous matrix phase comprising a copolymer of a monovinylidene aromatic monomer and an ethylenically unsaturated nitrile monomer and
      (ii) a rubber comprising
         (1) a star-branched rubber having three or more arms, said arms comprising one or more 1,3-butadiene homopolymer and
         (2) optionally, a linear rubber,
      wherein the rubber is dispersed as discrete rubber particles in the matrix.

2. The polymer blend composition of claim 1 wherein the branched aromatic carbonate polymer comprises from about 0.0005 to about 2.5 weight percent of a reacted branching agent.

3. The polymer blend composition of claim 1 wherein the branched aromatic carbonate polymer comprises a blend of:
   (i) one or more branched aromatic carbonate polymer components having different melt flow rates and molecular weights and
   (ii) one or more linear aromatic carbonate polymer components having different melt flow rates and molecular weights.

4. The polymer blend composition of claim 3 wherein the branched aromatic carbonate polymer comprises from about 5 to about 95 weight percent of component (a)(i) and from about 95 to about 5 weight percent of component (a)(ii) wherein weight percents are based on the combined weights of components (a)(i) and (a)(ii).

5. The polymer blend composition of claim 4 wherein the branched aromatic carbonate polymer comprises a blend of:
   (i) a branched aromatic carbonate polymer component having a weight average molecular weight of from about 28,000 to about 45,000 and
   (ii) a linear aromatic carbonate polymer component comprising
      (1) from about 60 to about 95 weight percent of a first linear aromatic carbonate polymer component having a weight average molecular weight of from about 15,000 to about 24,000 and
      (2) from about 40 to about 5 weight percent of a second linear aromatic carbonate polymer component having a weight average molecular weight of from about 28,000 to about 45,000,
   wherein the weight percents of component (a)(ii) are based on the combined weights of components (a)(ii)(1) and (a)(ii)(2),
said branched aromatic carbonate polymer having a weight average molecular weight of from about 19,000 to about 32,000.

6. The polymer blend composition of claim 4 wherein the branched aromatic carbonate polymer comprises a blend of:
   (i) a branched aromatic carbonate polymer component having a melt flow rate of from about 0.1 to about 10 grams per 10 minutes at conditions of 300° C. and 1.2 kg and
   (ii) a linear aromatic carbonate polymer component comprising
      (1) from about 60 to about 95 weight percent of a first linear aromatic carbonate polymer component having a melt flow rate of from about 40 to about 200 grams per 10 minute at conditions of 300° C. and 1.2 kg and
      (2) from about 40 to about 5 weight percent of a second linear aromatic carbonate polymer component having a melt flow rate of from about 1 to about 15 grams per 10 minute at conditions of 300° C. and 1.2 kg,
   wherein the weight percents of component (a)(ii) are based on the combined weights of components (a)(ii)(1) and (a)(ii)(2),
said polymer blend composition having a melt flow rate of from about 1 to about 20 grams per minute at conditions of 230° C. and 3.8 kg.

7. The polymer blend composition of claim 1 wherein the ethylenically unsaturated nitrile is from about 10 to about 35 weight percent of the copolymer.

8. The polymer blend composition of claim 1 wherein the monovinylidene aromatic monomer is styrene and the ethylenically unsaturated nitrile monomer is acrylonitrile.

9. The composition of claim 1 in the form of a molded or extruded article.

10. The molded or extruded article of claim 9 is selected from the group consisting of automotive door panels, fascia, instrument panels, fenders, hoods, trunk lids, side cladding parts, mirror housings, cowl vent grills, power tool housings, telephone housings, computer housings, hand held computer housings, personal data assistant housings, cell phone housings and copier housings.

11. The polymer blend composition of claim 1 further comprising an impact modifier having a glass transition temperature ($T_g$) equal to or less than 0° C.

12. The polymer blend composition of claim 11 wherein the impact modifier is a methyl methacrylate, butadiene and styrene core/shell grafted copolymer.

13. The polymer blend composition of claim 1 further comprising from 1 to 20 weight percent based on the weight of the polymer blend composition of a methacrylate, butadiene and styrene-type core/shell grafted copolymer.

14. The polymer blend composition of claim 1 wherein the star-branched rubber has about 4 arms.

15. The polymer blend composition of claim 1 wherein the rubber (ii) comprises:
   (1) from about 10 to about 90 weight percent of the star-branched rubber and
   (2) from about 90 to about 10 weight percent of the linear rubber, weight percents are based on the total weight of the rubber in the rubber-modified copolymer.

16. The polymer blend composition of claim 15 wherein the linear rubber is one or more 1,3-butadiene rubbers.

17. The polymer blend composition of claim 15 wherein the linear rubber is a 1,3-butadiene homopolymer.

18. The polymer blend composition of claim 15 wherein the linear rubber is a block copolymer of styrene and 1,3-butadiene.

19. The polymer blend composition of claim 18 wherein the block copolymer comprises from about 50 to about 90 weight percent 1,3-butadiene based on the weight of the block copolymer.

20. The polymer blend composition of claim 16 wherein the linear rubber comprises the same or a different 1,3-butadiene homopolymer as the arms of the star-branched rubber.

21. The polymer blend composition of claim 15 wherein the linear rubber comprises a 1,3-butadiene block copolymer.

22. The polymer blend composition of claim 1 wherein the average rubber particle size is from about 0.15 to 1.5 micometers.

23. The polymer blend composition of claim 1 wherein the polymer blend comprises:
   (a) from about 90 to 10 weight percent branched aromatic carbonate polymer and
   (b) from about 10 to 90 weight percent rubber-modified copolymer, weight percents are based on the weight of the polymer blend composition.

24. The polymer blend composition of claim 1 wherein the rubber-modified copolymer comprises:
   (i) from about 70 to 90 weight percent copolymer and
   (ii) from about 30 to 10 weight percent rubber, weight percents are based on the weight of the rubber-modified copolymer.

25. The polymer blend composition of claim 1 wherein the rubber comprises:
   (1) from about 30 to 70 weight percent 1,3-butadiene homopolymer star-branched rubber and
   (2) from about 70 to 30 weight percent styrene and butadiene block copolymer linear rubber, weight percents are based on the total weight of the rubber.

26. The polymer blend composition of claim 1 wherein the rubber comprises:
   (1) about 50 weight percent 1,3-butadiene homopolymer star-branched rubber and
   (2) about 50 weight percent styrene and butadiene block copolymer linear rubber, weight percents are based on the total weight of the rubber.

27. The polymer blend composition of claim 1 wherein the star-branched rubber is a 1,3-butadiene homopolymer having a solution viscosity, measured as a 5 weight percent solution in styrene at 25° C., of less than 60 centipoise.

28. The polymer blend composition of claim 1 wherein the matrix copolymer has a molecular weight of about 80,000 to about 240,000.

29. The polymer blend composition of claim 1 wherein the rubber-modified copolymer has a melt flow rate of about 1 to about 10 gram per 10 minutes at conditions of 220° C. and an applied load of 10 kg.

30. A method for preparing a polymer blend composition comprising the step of combining:
  (a) a branched aromatic carbonate polymer and
  (b) a rubber-modified copolymer comprising
    (i) a continuous matrix phase comprising a copolymer of a monovinylidene aromatic monomer and an ethylenically unsaturated nitrile monomer and
    (ii) a rubber comprising
      (1) a star-branched rubber having three or more arms, said arms comprising one or more 1,3-butadiene homopolymer and
      (2) optionally, a linear rubber,
    wherein the rubber is dispersed as discrete rubber particles in the matrix.

31. The method of claim 30 wherein the branched aromatic carbonate polymer is a blend of a branched aromatic carbonate polymer component and one or more linear aromatic carbonate polymer components having different melt flow rates and molecular weights, the monovinylidene aromatic monomer is styrene, the ethylenically unsaturated nitrile monomer is acrylonitrile, the star-branched rubber has about four arms comprising a 1,3-buatadiene homopolymer and the linear rubber comprises a styrene and 1,3-butadiene block copolymer.

32. A method for producing a molded or extruded article of a polymer blend composition comprising the steps of:
  (A) preparing a carbonate polymer composition comprising
    (a) a branched aromatic carbonate polymer and
    (b) a rubber-modified copolymer comprising
      (i) a continuous matrix phase comprising a copolymer of a monovinylidene aromatic monomer and an ethylenically unsaturated nitrile monomer and
      (ii) a rubber comprising
        (1) a star-branched rubber having three or more arms, said arms comprising one or more 1,3-butadiene homopolymer and
        (2) optionally, a linear rubber,
      wherein the rubber is dispersed as discrete rubber particles in the matrix, and
  (B) molding or extruding said carbonate polymer composition into a molded or extruded article.

33. The method of claim 32 wherein the molded or extruded article is selected from the group consisting of automotive door panels, fascia, instrument panels, fenders, hoods, trunk lids, side cladding parts, mirror housings, cowl vent grills, power tool housings, telephone housings, computer housings, hand held computer housings, personal data assistant housings, cell phone housings and copier housings.

34. The polymer blend composition of claim 1 further comprising one or more ignition resistance additives selected from halogenated hydrocarbons, halogenated carbonate oligomers, halogenated diglycidyl ethers, organophosphorous compounds, fluorinated olefins, antimony oxide or metal salts of aromatic sulfur.

\* \* \* \* \*